United States Patent
Müller

(10) Patent No.: US 7,171,211 B2
(45) Date of Patent: Jan. 30, 2007

(54) ESTIMATING SIGNAL STRENGTH MEASUREMENTS IN A TELECOMMUNICATIONS SYSTEM

(75) Inventor: Walter Müller, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 167 days.

(21) Appl. No.: 10/468,046

(22) PCT Filed: Feb. 4, 2002

(86) PCT No.: PCT/EP02/01136

§ 371 (c)(1),
(2), (4) Date: Jan. 9, 2004

(87) PCT Pub. No.: WO02/067470

PCT Pub. Date: Aug. 29, 2002

(65) Prior Publication Data

US 2005/0032520 A1 Feb. 10, 2005

(30) Foreign Application Priority Data

Feb. 16, 2001 (GB) ............................. 0103967.6

(51) Int. Cl.
*H04Q 7/20* (2006.01)
(52) U.S. Cl. ................. 455/448; 455/115.1; 455/226.1
(58) Field of Classification Search ................ 455/448, 455/446, 436–439, 67.11, 403, 423, 115.1, 455/115.3, 226.1, 226.2, 226.3
See application file for complete search history.

(56) References Cited

U.S. PATENT DOCUMENTS

| 4,718,081 | A | 1/1988 | Brenig ..................... 379/60 |
| 5,774,809 | A * | 6/1998 | Tuutijarvi et al. .......... 455/437 |
| 5,970,407 | A | 10/1999 | Brunner et al. ............. 455/437 |
| 6,052,598 | A | 4/2000 | Rudrapatna et al. |
| 6,122,512 | A | 9/2000 | Bodin |
| 6,141,542 | A * | 10/2000 | Kotzin et al. ............... 455/101 |
| 6,330,460 | B1 * | 12/2001 | Wong et al. .............. 455/562.1 |
| 6,362,783 | B1 * | 3/2002 | Sugiura et al. ............. 342/457 |

(Continued)

FOREIGN PATENT DOCUMENTS

WO    WO 98/15149    4/1998

(Continued)

OTHER PUBLICATIONS

P T Thompson, et al., "Results of the Tsunami Field Trials: Position Location in Macro and Micro Cell Environments", The Institution of Electrical Engineers, IEE, 1999, (pp. 3/1-3/8).

(Continued)

*Primary Examiner*—CongVan Tran
(74) *Attorney, Agent, or Firm*—Roger S Burleigh

(57) ABSTRACT

The number of measurements being performed in a telecommunications system can be reduced by performing a predetermined measurement in Cell A and in co-located Cell B, step 1, for example a received signal code power (RSCP) measurement. The difference between the two signals is determined, and stored for future reference, step 3. Once the difference value has been established, the mobile station no longer needs to perform measurements on both Cell A and Cell B. Instead, if a subsequent measurement is made on Cell A, step 5, the network can estimate the measurement for Cell B based on the difference signal previously determined, step 7.

18 Claims, 2 Drawing Sheets

U.S. PATENT DOCUMENTS

| | | |
|---|---|---|
| 6,434,130 B1 * | 8/2002 | Soininen et al. ............. 370/331 |
| 6,591,110 B1 * | 7/2003 | Kim et al. .................. 455/453 |
| 6,650,872 B1 * | 11/2003 | Karlsson .................. 455/67.11 |
| 6,650,905 B1 * | 11/2003 | Toskala et al. ............. 455/522 |
| 6,680,924 B1 * | 1/2004 | Hills et al. .................. 370/329 |
| 6,792,276 B1 * | 9/2004 | Butovitsch et al. ......... 455/453 |
| 6,826,410 B1 * | 11/2004 | Simonsson et al. ......... 455/506 |
| 6,845,238 B1 * | 1/2005 | Muller ....................... 455/436 |
| 6,845,239 B1 * | 1/2005 | Sato et al. ............... 455/456.1 |
| 6,885,694 B1 * | 4/2005 | He et al. .................... 375/144 |

FOREIGN PATENT DOCUMENTS

| | | |
|---|---|---|
| WO | WO 99/34633 | 7/1999 |
| WO | WO 00/38457 | 6/2000 |
| WO | WO 98/00432 | 1/2004 |

OTHER PUBLICATIONS

Richard Klukas, et al., "Field Tests of a Cellular Telephone Positioning System", IEEE, 1997, (pp. 470-474).

* cited by examiner

ESTIMATING SIGNAL STRENGTH MEASUREMENTS IN A TELECOMMUNICATIONS SYSTEM

FIELD OF THE INVENTION

The present invention relates to performing measurements in a telecommunications system, and in particular, to estimating measurements in a telecommunications system, thereby reducing the number of measurements being performed.

BACKGROUND OF THE INVENTION

In a telecommunications system, for example a wideband CDMA system (WCDMA), there is always a desire to communicate using the least amount of power. Therefore, all transmissions should ideally be performed at the lowest possible power level, while still maintaining an acceptable quality level.

However, there are certain factors which act against this general desire to reduce power levels. Certain communication techniques have an inherent need for the power levels to be increased, both in the mobile station and the network.

For example, data compression can be used to transmit a given amount of data in less time, resulting in gaps being created to allow inter-frequency or inter-RAT (Radio Access Technology) measurements to be carried out.

In addition to the peak power being increased during the data compression, the average power also needs to be increased to compensate for the channel estimates that are not being updated during the time gaps, resulting in the receiver not being optimally tuned after the time gaps.

While increased inter-frequency and inter-RAT measurements typically have the disadvantage of increasing the average power consumption when using real time services with requirements of low delays, for example speech, they also have a degrading effect in that they reduce the available channelization-codes. During data compression a code for a lower spreading factor needs to be used, which typically blocks several codes used for higher spreading factors in the downlink.

The gaps in transmission mentioned above can also occur in other ways. For example, reducing the number of bits to be transmitted by reducing the number of extra bits which are used for error correction during some frames (i.e. code puncturing), or scheduling data transmission from a higher layer.

It is known to reduce the power requirement (and in turn improve data throughput) by reducing the number of measurements carried out in the telecommunications system. One known example of how this may be achieved is based on the use of neighbouring cell lists, and thresholds for starting measurements.

This type of solution suffers from the disadvantage that each neighbouring cell is treated equally as if they were adjacent neighbours using different antennas covering different, but to some extent overlapping, geographical areas. The reduction in these schemes is based on limiting the number of neighbouring cells included in the list, and on handover statistics and propagation predictions when cell planning is performed.

The aim of the present invention is to provide a method of estimating measurements in a telecommunications system, thereby reducing the number of measurements being performed. This has the advantage of reducing power consumption and increasing the capacity of the system.

SUMMARY OF THE INVENTION

According to a first aspect of the present invention, there is provided a method of estimating a signal measurement in a telecommunications system, the method comprising the steps of: performing a first measurement in first and second co-located cells of the telecommunications system; determining a difference value between the measurements; and using the difference value to estimate a second measurement for the second cell, based on a second measurement being made in the first cell.

According to another aspect of the present invention, there is provided a telecommunications system in which signal strength measurements are performed in two or more co-located cells, the system comprising: means for measuring a first measurement in first and second co-located cells of the telecommunications system; means for determining a difference value between the measurements; and means for estimating a second measurement for the second cell, based on a second measurement being made in the first cell and the previously determined difference value.

According to another aspect of the present invention, there is provided a communications node for a telecommunications system in which signal strength measurements are performed in two or more co-located cells, the communications node comprising means for receiving a first measurement from first and second co-located cells of the telecommunications system, means for determining a difference value between the measurements, and means for estimating a second measurement for the second cell, based on a second measurement being made in the first cell and the previously determined difference value.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION OF A PREFERRED EMBODIMENT OF THE PRESENT INVENTION

In a WCDMA based radio access network, several cells may be co-located using different frequencies. The network will have information that a particular cell, say Cell A, is co-located with one or more other cells, say Cell B.

A mobile station positioned in a given location is able to make signal measurements on common pilot channels (CPICHs) transmitted from a serving cell and any co-located cells.

Figure 1:
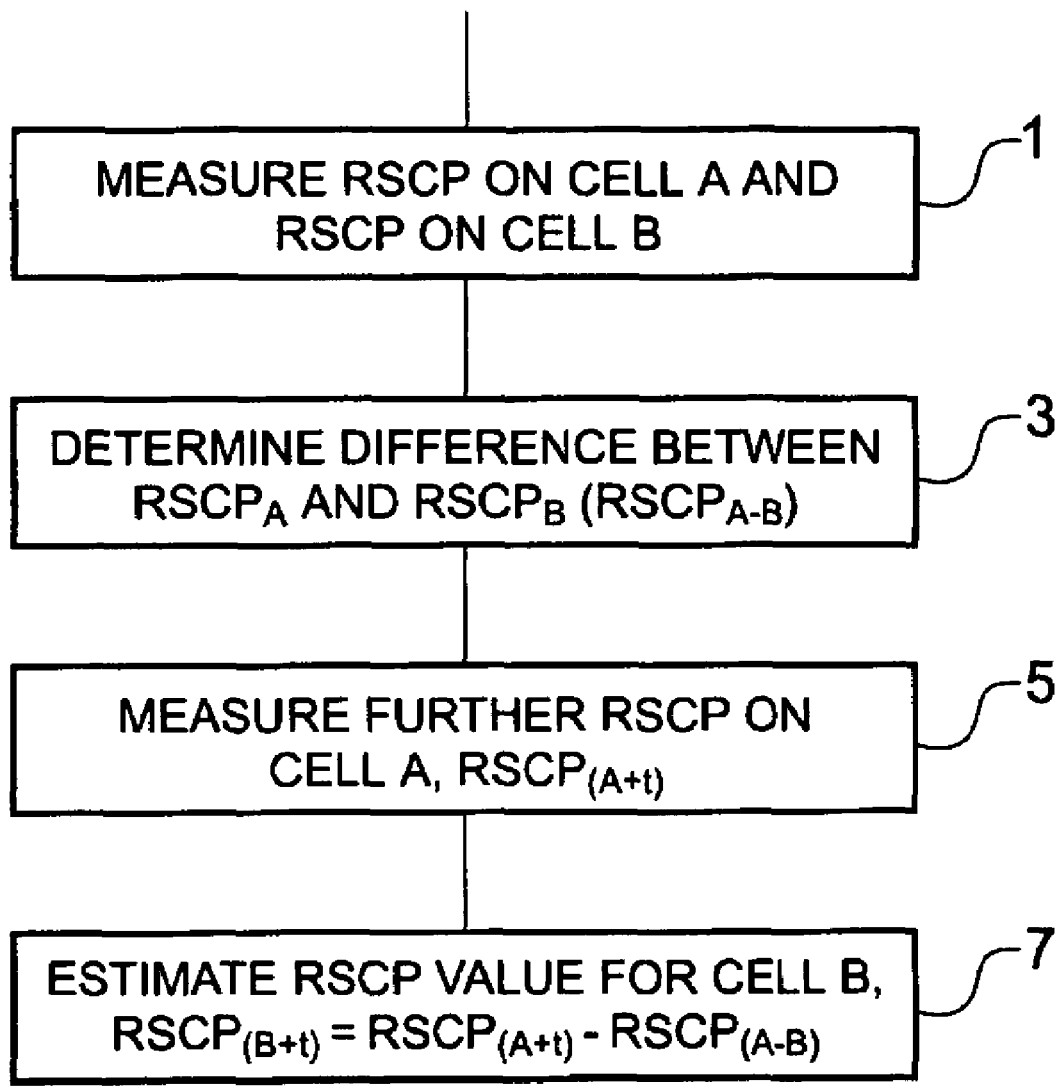
FIG. 1 shows the steps involved in a method of estimating a measurement according to a first aspect of the present invention; and, FIG. 2 shows the steps involved in a method of estimating a measurement according to a second aspect of the present invention.

FIG. 1 shows the steps involved in estimating a measurement according to a first aspect of the present invention.

In step 1, the network instructs a mobile station to perform a predetermined measurement in Cell A and in co-located Cell B, for example a received signal code power (RSCP) measurement, hereinafter referred to as $RSCP_A$ and $RSCP_B$, respectively. These measurements are reported by the mobile station to the network.

The network determines the difference between the two signals ($RSCP_{A-B}$) which is stored for future reference, step 3.

Once the difference value has been established, the mobile station no longer needs to perform measurements on both Cell A and Cell B. The network can therefore suspend inter-RAT or inter-frequency RSCP measurements.

Instead, if a subsequent measurement is made on Cell A ($RSCP_{A+t}$), step 5, the network can estimate the measurement for Cell B based on the difference signal previously determined. For example, if the difference signal was originally determined by subtracting $RSCP_B$ from $RSCP_A$, then the estimated value for Cell B is determined by subtracting the difference value $RSCP_{A-B}$ from the new measurement for Cell A, $RSCP_{A+t}$, step 7.

$$Thus, RSCP_{B+t} = (RSCP_{A+t} - RSCP_{A-B})$$

Since Cell A is co-located with Cell B, the path loss difference will remain constant for all locations of the mobile station, which means that the RSCP difference $RSCP_{A-B}$ also remains constant. This difference value can therefore provide an accurate estimate of a measurement for one cell, using the measurement of a co-located cell.

Measurements in Cell B can be restarted at any time, for example if the estimated measurement approaches a critical value.

According to another aspect of the invention, the difference value described above can be used to provide further reductions in measurements. In addition to RSCP measurements, a mobile station may perform any one, or any combination, of the following measurements, depending upon the processing utilised in the mobile station:

1. UTPA carrier RSSI (this stands for received signal strength indicator, and relates to signal strength plus interference on a particular frequency from any intra frequency cell)
2. CPICH RSCP (this stands for received signal code power, and relates to signal strength from a particular cell's CPICH on a particular frequency)
3. CPICH Ec/No (this is basically the signal-to-noise ratio used for representing the "cell quality" for handover evaluation).

Each of the measurements described above imposes a different demand on the telecommunications system in terms of the processing power required, and/or the time needed to perform a given measurement. In other words, certain measurements are more "expensive" than others. For example, the CPICH Ec/No measurement requires typically more processing power that the CPICH RSCP measurement, which is turn requires more processing power than the UTRA carrier RSSI measurement.

The measurements described above have a predetermined relationship whereby:

$$CPICH\ Ec/No = (CPICH\ RSCP)/(UTRA\ carrier\ RSSI)$$

Using this relationship, the estimation method according to the first aspect of the invention can be used to reduce the number of "expensive" measurements being made, for example by reducing the number of CPICH Ec/No measurements being performed in the telecommunications system.

Figure 2:
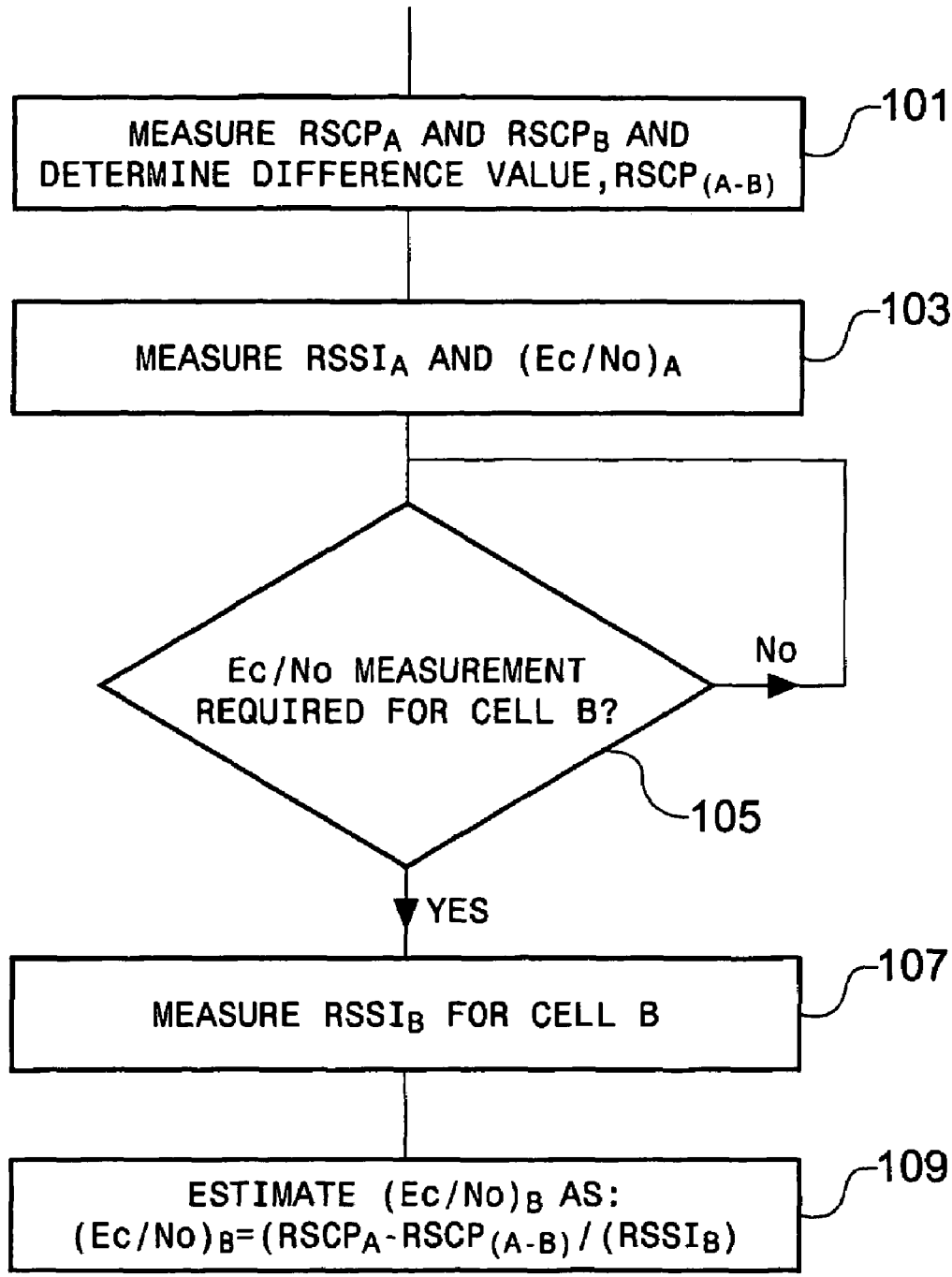

Referring to FIG. 2, a difference signal is first determined, as mentioned above, by calculating the difference between the $RSCP_A$ and $RSCP_B$ measurements, ($RSCP_{A-B}$), step 101.

The $RSSI_A$ measurement and $(Ec/No)_A$ measurement for Cell A are also performed, step 103. Depending upon the particular implementation in a given mobile station, the $(Ec/No)_A$ measurement can either be calculated directly, or calculated from the $RSCP_A$ and $RSSI_A$ values.

Next, when it is determined that an Ec/No measurement is subsequently required for Cell B, step 105, instead of measuring this value directly, the measurement can be estimated as follows. First, the RSSI value for cell B is measured, $RSSI_B$, as shown in step 107. The Ec/No measurement can then be estimated from the $RSSI_B$ measurement, using a $RSCP_A$ measurement for cell A and the previously stored difference value $RSCP_{A-B}$, as follows:

$$(Ec/No)_B = (RSCP_A - RSCP_{A-B})/(RSSI_B)$$

Thus, the Ec/No measurement for cell B can be estimated without having to perform a relatively costly CPICH RSCP measurement for cell B. Instead, only the less costly UTRA RSSI measurement needs to be made for cell B. Also, since the RSCP and Ec/No measurements for cell A are being made in the same cell that the mobile station is currently using, these measurements are also less costly than the corresponding measurements for cell B (i.e. being the cell which is not currently being used by the mobile station).

The Ec/No measurement for cell A and the estimated Ec/No measurement for cell B may be used to distribute traffic between cells, for example, to trigger handover between cell A and cell B.

As noted above, since the RSSI measurement for cell B is less demanding than the Ec/No measurement, power consumption is thereby reduced.

For example, assume that one 7 slot wide measurement gap is used every third frame (each frame consisting of 15 slots) for inter-frequency compressed mode measurements on CPICH Ec/No, and that the average DL power needs to be increased by 3 dB to maintain the same connection quality.

The width of the measurement gap can be decreased to one slot used every third frame, and, if the power increase required to maintain the same quality can be assumed to be decreased by 1/7 because of that, the following difference in power can be calculated.

This corresponds to a 0.6 dB increase (i.e. 1.143 times increase) instead of 3 dB increase (i.e. 2 times increase) when making CPICH Ec/No measurements.

Thus, if it is assumed that all the mobiles in a cell are using compressed mode at all times then, if the nominal amount of mobiles is planned to be limited to 20 per cell using 1 watt each when not using compressed mode, the estimated amount of mobiles when using compressed mode and the same DL power margins would be:

20/2=10 mobiles when the mobiles are performing inter-frequency CPICH Ec/No measurements all of the time, and 20/1.143=17.5 mobiles when using estimation according to the second aspect of the invention, whereby RSSI measurements are carried out instead.

According to the first and second aspects of the invention, rather than having a mobile station perform measurements on each of the co-located cells, the mobile station determines a relationship between the cells, assumes that this relationship remains constant, and then performs measurements on just one cell—the other cell's measurements being estimated from the known relationship with the first cell.

Also, if different measurements within a given cell have different power requirements, the high power measurements can be estimated by measuring the lower power measurements, and calculating the higher power measurements accordingly.

As can be seen from the above, estimating measurements in this way has the effect of reducing the number of measurements being performed. This has the effect of reducing power consumption and increasing the capacity of the telecommunications system, thereby enabling a greater number of mobile stations to be supported.

Although the preferred embodiment refers to the difference value being calculated with respect to the respective RSCP measurements from each cell, the invention is equally applicable to other signals being used in this manner, for example determining a difference signal using the BCCH frequency RXLEV in a GSM system, or measured despread signal strength on a IS95 system.

Also, although the invention has been described as performing measurements between two co-located cells, the invention may be used with just one cell, or with any number of co-located cells.

Furthermore, the invention can be used in the same way for evaluating cells on a frequency other than the frequency being used, to determine whether they should belong to the active set.

For example, by using knowledge about the active set on the currently used frequency and also the knowledge that the cells on used and unused frequencies are co-located, the measurement requirements on the unused frequency will only be UTRA Carrier RSSI and information on $RSCP_{B+t}$, allowing the CPICH Ec/No value to be used for evaluating the cells on the unused frequency, to determine whether they should belong to the active set.

The invention claimed is:

1. A method of estimating a signal measurement in a telecommunications system, the method comprising the steps of:
   performing a first measurement in first and second co-located cells of the telecommunications system;
   determining a difference value between the measurements; and
   using the difference value to estimate a second measurement for the second cell, based on a second measurement being made in the first cell;
   wherein the second measurement is a different type of measurement to the first measurement, but having a predetermined relationship to the first measurement, and wherein the second measurement is a CPICH Ec/No measurement.

2. A method as claimed in claim 1, wherein the second measurement is the same type of measurement as the first measurement.

3. A method as claimed in claim 1, wherein the first measurement is a received signal code power (RSCP) measurement.

4. A method as claimed in claim 1, wherein the measurement are performed at a mobile station in the telecommunications system and the difference value stored at a network side of the telecommunication system.

5. A method as claimed in claim 1, wherein the method of estimating a measurement is used to evaluate which cells should belong to an active set on a frequency other than the frequency being used.

6. A method of handover in a cellular telecommunications system, the method of handover using a method of estimating a signal strength measurement as defined in claim 1.

7. A telecommunications system in which signal strength measurements are performed in two or more co-located cells, the system comprising:
   means for measuring a first measurement in first and second co-located cells of the telecommunications system;
   means for determining a difference value between the measurements; and
   means for estimating a second measurement for the second cell, based on a second measurement being made in the first cell and the previously determined difference value;
   wherein the second measurement is a different type of measurement to the first measurement, but having a predetermined relationship to the first measurement, and wherein the second measurement is a CPICH Ec/No measurement.

8. A system as claimed in claim 7, wherein the second measurement is the same type of measurement as the first measurement.

9. A system as claimed in claim 7, wherein the first measurement is a received signal code power (RSCP) measurement.

10. A system as claimed in claim 7, wherein the measurements are performed at a mobile station in the telecommunications system and the difference value stored at a network side of the telecommunications system.

11. A system as claimed in claim 7, having means for evaluating which cells should belong to an active set on a frequency other than the frequency being used.

12. A mobile communications terminal for use in a telecommunications system as claimed in claim 7.

13. A communications node for a telecommunications system in which signal strength measurements are performed in two or more co-located cells, the communications node comprising:
    means for receiving a first measurement from first and second co-located cells of the telecommunications system;
    means for determining a difference value between the measurements; and
    means for estimating a second measurement for the second cell, based on a second measurement being made in the first cell and the previously determined difference value;
    wherein the second measurement is a different type of measurement to the first measurement, but having a predetermined relationship to the first measurement, and wherein the second measurement is a CPICH Ec/No measurement.

14. A communications node as claimed in claim 13, wherein the second measurement is the same type of measurement as the first measurement.

15. A communications node as claimed in a claim 13, wherein the first measurement is a received signal code power (RSCP) measurement.

16. A method of estimating a signal measurement in a communications node of a telecommunications system, the method comprising the steps of:
    receiving a first measurement from first and second co-located cells of the telecommunications system;
    determining a difference value between the measurements; and
    using the difference value to estimate a second measurement for the second cell, based on a second measurement being made in the first cell;
    wherein the second measurement is a different type of measurement to the first measurement, but having a predetermined relationship to the first measurement, and wherein the second measurement is a CPICH Ec/No measurement.

17. A method as claimed in claim 16, wherein the second measurement is the same type of measurement as the first measurement.

18. A method as claimed in claim 16, wherein the first measurement is a received signal code power (RSCP) measurement.

* * * * *

UNITED STATES PATENT AND TRADEMARK OFFICE
CERTIFICATE OF CORRECTION

PATENT NO. : 7,171,211 B2
APPLICATION NO. : 10/468046
DATED : January 30, 2007
INVENTOR(S) : Muller It is certified that error appears in the above-identified patent and that said Letters Patent is hereby corrected as shown below:

In Column 3, Line 32, delete "UTPA" and insert -- UTRA --, therefor.

In Column 5, Lines 45-46, in Claim 4, delete "measurement" and insert -- measurements --, therefor.

In Column 5, Line 48, in Claim 4, delete "telecommunication" and insert -- telecommunications --, therefor.

Signed and Sealed this

Twenty-fifth Day of March, 2008

JON W. DUDAS
*Director of the United States Patent and Trademark Office*